United States Patent

[11] 3,573,356

[72] Inventor Francis G. Toce
Syracuse, N.Y.

[21] Appl. No. 704,474
[22] Filed Feb. 9, 1968
[45] Patented Apr. 6, 1971
[73] Assignee General Electric Company

[54] METHOD OF RECORDING SLOW SCAN VIDEO SIGNALS FOR REPRODUCTION AT NORMAL SCAN RATES
2 Claims, 10 Drawing Figs.

[52] U.S. Cl. 178/6.6SF
[51] Int. Cl. H04n 5/78
[50] Field of Search 179/100.2 (T), 15.55; 178/6 (BWR), 6.6 (A), 6.6 (S.F.), 6.6 (F.S.S.)

[56] References Cited

UNITED STATES PATENTS

| | | | |
|---|---|---|---|
| 3,157,738 | 11/1964 | Okamura | 179/100.2 |
| 3,197,559 | 7/1965 | Kihara | 179/100.2 |
| 3,283,068 | 11/1966 | Urrey et al. | 178/6.6 |
| 3,322,892 | 5/1967 | Yasuoka et al. | 178/6.6 |
| 3,359,365 | 12/1967 | Kihara | 178/6.6 |
| 3,391,248 | 7/1968 | Hirota | 179/100.2 |
| 3,431,353 | 3/1969 | Kihara et al. | 178/6.6 |
| 3,470,316 | 9/1969 | Kihara | 179/100.2 |

*Primary Examiner*—James W. Moffitt
*Assistant Examiner*—Robert S. Tupper
*Attorneys*—W. J. Shanley, Marvin Snyder, Frank L. Neuhauser, Oscar B. Waddell and Thomas A. Briody

ABSTRACT: A television recording and reproducing technique for enabling generation and recording of video signals corresponding to images at slow scan rates and reproduction of video signals at normal scan rates without real time errors in the reconstructed images. As applied to a helical scan, skip-field, magnetic tape recorder, video signals are developed at one-half horizontal and vertical scan rates and successive fields of video are recorded in successive tracks on the magnetic tape at one-half the normal recording rate. To provide video for reconstruction of the images, each field of recorded video is scanned twice in succession at the normal rate.

INVENTOR:
FRANCIS G. TOCE,

BY Julius J. Zaskalicky

HIS ATTORNEY.

INVENTOR:
FRANCIS G. TOCE,
BY Julius J. Zaskalicky
HIS ATTORNEY.

INVENTOR:
FRANCIS G. TOCE,
BY Julius J. Zaskalicky
HIS ATTORNEY.

METHOD OF RECORDING SLOW SCAN VIDEO SIGNALS FOR REPRODUCTION AT NORMAL SCAN RATES

BACKGROUND OF THE INVENTION

Helical scan, skip-field, magnetic tape recorders are commonly used for recording and reproducing video signals. Such recorders include a supply reel, a takeup reel and a cylindrical video head drum located between the supply and takeup reels. A rotor is provided within the video head drum on an axis colinear with the axis of the drum with a pair of video heads spaced apart by 180° plus the arc corresponding to linear tape travel in the time of one field for reasons to be explained below. A slot is provided in the video head drum in the vicinity of the heads to enable the heads to scan the tape. Magnetic tape is threaded from the supply reel, around the video head drum in substantially a half helix and then onto the takeup reel.

In operation, the tape is moved at a relatively slow rate along the drum and the rotor is rotated at a relatively fast rate. The rates are correlated so that each head is successively in operative relationship with the tape for a time corresponding to a field of video scan. One video head only is used during a recording operation and accordingly only every other field of video is recorded. On playback, both heads are used. Each head scans the same track in succession to produce two identical fields of video. With such an arrangement tape consumption is reduced in half at the expenses of some loss in resolution.

For portable applications such tape recorders should be small and light. Such objectives have been achieved in the prior art to a limited extent by eliminating elements in the recorder not required for recording function, i.e. the elements required only for playback. Conventional light weight cameras have been used for converting images into video signals for application to the recorder.

The present invention is directed to the provision of reductions in the size, weight and complexity not only in the portable magnetic tape recording apparatus for the recording of video signals but also in the portable cameras associated therewith without compromising the quality of the recording of the video signals.

SUMMARY OF THE INVENTION

To this end in an exemplary embodiment of the invention the horizontal and vertical rates of electron beam scan of the camera are reduced to one-half and the rate of head scan across the tape in the recorder is reduced by one-half. In one embodiment for accomplishing the latter result two heads are placed 180° apart and rotated at one-half the normal playback speed of the tape. Each field of scan is recorded on the tape first by one head and then by the other head. In another embodiment, a video head drum having one-half the diameter of the video head drum used on playback is used, and the tape is wrapped completely around the drum to form a 360° or full wrap helix. A single head is provided on the rotor which is rotated at the same angular speed as the rotor on the playback apparatus. As the drum is one-half the diameter of the drum used on the playback apparatus, the peripheral velocity of the head with respect to the tape would by one-half the peripheral velocity of the head on playback. On playback on a skip-field playback recorder, each track of the tape is scanned twice, once by each of two heads placed approximately 180° apart as explained above on the rotor to produce a video signal having scan rates or frequencies, horizontal and vertical, twice the scan frequencies of the pickup camera and corresponding to normal scan frequencies used for display. As two successive fields of scan are the same, the basic rate of still image presentation, i.e. 30 pictures per second, on a display device is achieved.

In the camera and recorder system of the present invention, use of lower frequency sweep currents or voltages simplify the sweep circuit and component designs and the design of the video amplifiers used in conjunction with the camera. With lower scan or sweep rates, narrower bandwidth video amplifiers can be used, thereby reducing the number of video stages required to produce the desired amplification. Also as lower video frequencies are developed, better signal to noise ratios are obtained in the camera. In the two head portable recorder, the size of the drive motor may be reduced as the speed required of the motor is one-half the speed otherwise required and in the one head portable recorder, the size of the drum assembly as well as the number of heads required is reduced.

The novel features believed characteristic of the invention are set forth in the appended claims. The invention itself, together with further objects and advantages thereof, may best be understood by reference to the following description taken in connection with the accompanying drawings in which:

Figure 1:
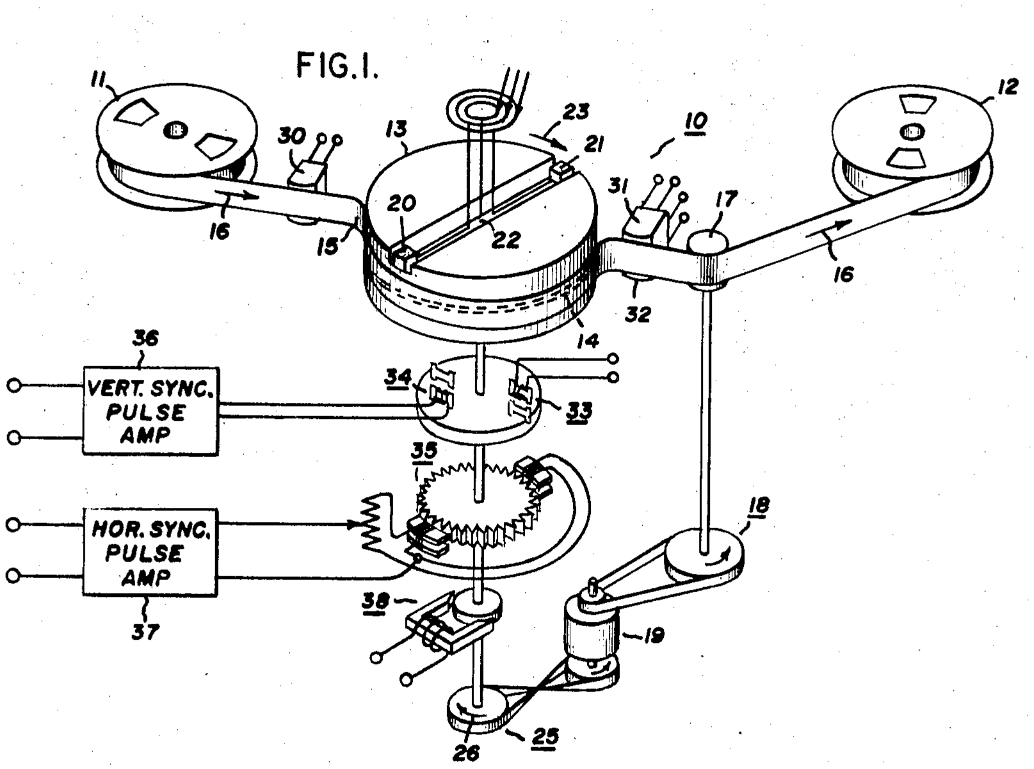
FIG. 1 is a schematic diagram in perspective of the tape transport and helical scan assemblies of a magnetic tape recorder along with means for generating pulses of appropriate frequencies for use in the electron beam scan functions in a camera in accordance with the present invention.

Referring now to FIG. 1, there is shown a schematic diagram in perspective of the tape transport and the helical scan mechanism 10 of a skip-field helical scan video magnetic tape record and playback apparatus. In this figure, there is shown a supply reel 11 and a takeup reel 12 between which is located a cylindrical video head drum 13 having a slot 14 circumferentially oriented in the surface thereof. Tape 15 is threaded from the supply reel 11 through a series of tape guides (not shown) about the video head drum 13 in a half-helix that is, a helix that extends for substantially 180° about the cylinder, and, on to the takeup reel 12 in the direction indicated by arrows 16. As the tape 15 extends across the drum in a half-helix the slot 14 is obliquely oriented with respect to the tape.

The tape 15 is drawn across the tape guide drum 13 by means of a drive capstan 17 which is connected through a pulley-and-belt arrangement 18 to the drive motor 19. On forward drive, a pinch roller (not shown) is caused to engage the tape 15 against the drive capstan 17 to produce forward drive or pullthrough of the tape. Of course, it will be appreciated that various tape-tensioning mechanisms are conventionally used in connection with the supply as well as the takeup reel elements of the transport to assure proper tape tension for the recording and playback functions.

A pair of heads 20 and 21 are provided on a rotor 22 having an axis colinear with the axis of the video head drum 13. The heads 20 and 21 are located approximately on opposite sides of the rotor 22, that is, displaced approximately 180° apart, one from the other, and placed so that the rotation indicated by arrow 23 of the rotor causes the heads to pass in the vicinity of the slot and, thus, to trace out an oblique or skew path with respect to the longitudinal dimension of the tape 15. The rotor 22 is connected to the shaft 24 which, by means of a pulley-and-belt arrangement 25, is driven in the appropriate direction, as shown by arrow 26 by the drive motor 19. The rotation of the rotor 22 is arranged such that for each scan of a head over the tape, the time elapsed corresponds to the time of one field. One head is used on recording and two heads are used on playback.

In recorders for use in television systems, having a field repetition rate of one-sixtieth of a second, the heads rotate at 1,800 revolutions per minute or 30 revolutions per second. The movement of the tape in the longitudinal direction is at a slow rate, for example, 7½inches per second. Accordingly, a field of the television signal applied to a single head would be recorded on a single track on the tape and only every other field of video would be recorded. On playback, each of the two heads scans the same track in succession to producing a video signal in which two successive fields are identical. As the field rate is one-sixtieth of a second, objectional flicker does not appear in the image reproduced from the video signal. The advantage of the skip-field recorder such as described is that tape useage is reduced in half as only information in every other field is recorded. The image reproduced from such a recording has less resolution than a recording which included the information in every field. However, as there usually is not much change in information in a pair of successive fields, serious degradation of the image does not usually result.

To obtain identical video signals from each of the two heads in successive scans of the same track, it is necessary to lag the angular disposition of the second head in respect to a diametrically opposite position of the first head by a small amount so that the second head starts at the beginning of the track scanned by the first head. By the time the first head has scanned a track the tape has advanced in the longitudinal direction. Accordingly, were the second head located 180° from the first head, it will have started at a point within rather than at the beginning of the track. In conjunction with the lag arrangement in the location of the pickup head, the tape is wrapped around the drum an extent slightly beyond 180° so that the second head location coincides with the beginning of the track.

Also provided on the supply side of the tape guide drum 13 is an erasing head 30 to which a electrical signal of supersonic frequency, for example 80,000 kilocycles, is supplied to erase any signal recorded on the tape and prepare it for recording of video and other signals. On the takeup side of the tape guide drum 13 is located an assembly including an audio recording and playback head 31 and a control pulse recording and playback head 32. To the audio head 31 are applied the audio signals in a conventional manner to be described below in connection with FIG. 7 for recording audio signals in conjunction with the video recording. In the video recording process 30-cycle control pulses are applied to the control head 32 and in the video playback process 30-cycle pulses are developed in a manner to be described in connection with FIG. 6. Such pulses are used for maintaining proper synchronization of the recording and pickup heads on record and playback in respect to the longitudinal motion of the tape over the drum. Such synchronization assures that on playback the pickup heads start scanning at the beginning of each track.

Also shown in FIG. 1 are electromechanical generators, 33, 34, and 35, of pulses of appropriate frequency useful in the operation of pickup cameras used in conjunction with the tape recorder and also for use in connection with the display of the video signals on a video display device. The rotors of the generators 33, 34, and 35 are mechanically secured to the shaft 24. The particular recorder illustrated in FIG. 1 is suitable for use in connection with television systems employing standards commonly used in the United States. Accordingly, a 60-cycle pulse generator 34 consisting of a rotor with two permanent magnetic members, each located diametrically opposite one another, and a pickup coil in proximity thereto is provided. During each revolution of the rotor two impulses of voltage are induced in the pickup coil and, as the rotation rate is 30 cycles per second, the resultant impulse rate is 60 cycles per second. Such pulses are applied to a pulse amplifier 36. The 30-cycle pulse generator 33 providing pulses for synchronization of longitudinal tape motion with the rotation of the video heads consists of another coil coupled to another magnetic member disposed on the same rotor. In this arrangement for each revolution of the magnetic member, an impulse of voltage is induced in the coil. The horizontal scan pulse generator 35 consists of a multitooth magnetic rotor and a pair of diametrically opposed pickup coils. The output from the pickup coils is applied to pulse amplifier 37. With this arrangement, for each revolution of the rotor the prescribed number of horizontal drive pulses are developed.

The stator and rotor assembly designated 38 is an eddy current brake useful in conjunction with the 30-cycle pulse generator source 33 and associate circuits to be described in connection with FIG. 6 for providing braking action to the rotor 22 to maintain proper synchronization of the rotation of heads 20 and 21 with respect to the longitudinal motion of the tape 15.

Figure 2:
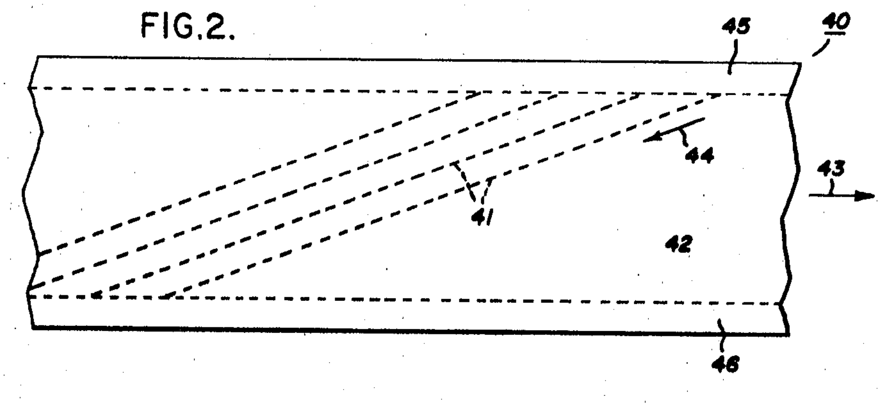
FIG. 2 is an enlarged plan view of a section of the magnetic tape of FIG. 1 showing the various recording areas thereof, the manner in which magnetic tape is moved and the video signals recorded in tracks therein.

Referring now to FIG. 2, there is shown a plan view of an enlarged section 40 of the magnetic tape 15 used in the apparatus of FIG. 1. The oblique or slant lines 41, all in parallel, appearing in the central portion 42 of the tape represents the path or track of the tape scanned by the recording head as it moves from right to left in the drawing of FIG. 1. The arrows 43 and 44 in this FIG. represent the longitudinal motion of the tape 15, and the direction of scan of the tape by a video recording heads 20 and 21 respectively. Each track represents a field of video signals. On the upper margin portion 45 of the tape, the audio signals associated with the recording are recorded by means of head 31. Along the lower margin portion 46 are recorded by head 32 the nominally 30-cycle synchronizing pulses used for synchronizing the video heads with respect to the longitudinal motion of the tape on playback.

Figure 3:
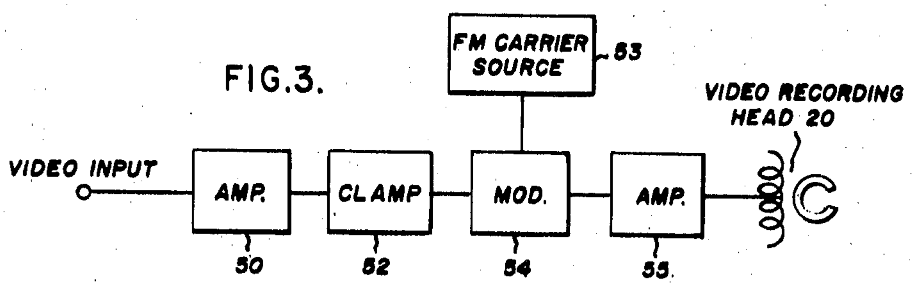
FIG. 3 is a block diagram of the electrical circuit used for processing video signals into a form for application to the video-recording heads of FIG. 1.

Referring now to FIG. 3, there is shown a block diagram of a circuit for processing the video signals obtained from a television camera or from some other source for application to the video-recording head of FIG. 1, for example head 20. The circuit includes an amplifier 50, a clamp circuit 52, a source of frequency modulation carrier 53, a modulator 54, and an amplifier 55. The video signals are applied to amplifier 50, the output of which is clamped by clamp 52 to a DC reference level corresponding to a particular unmodulated carrier frequency. The frequency modulation carrier from source 53 is modulated by the clamped video in the modulator 54. The resultant signal is amplified and applied to the recording head 20. A frequency modulation system is commonly used in video recorders for the reason that it provides good signal to noise ratio for low frequency signals, eliminates amplitude variations on record and playback, and also eliminates the need for a bias frequency source.

Figure 4:
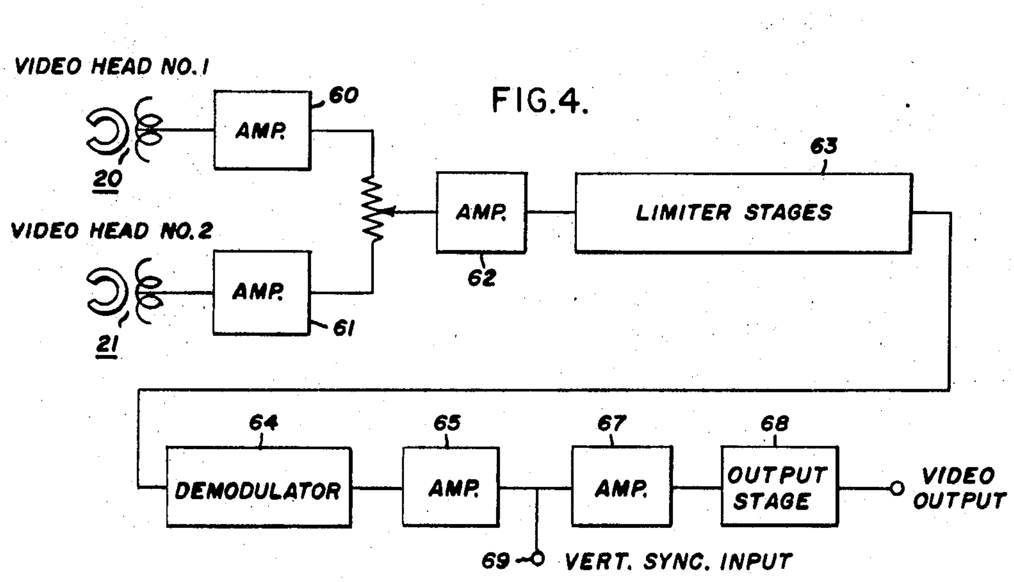
FIG. 4 is a block diagram of the electrical circuit of the recorder used for reproducing the video signals recorded on the magnetic tape.

Referring now to FIG. 4, there is shown a block diagram of a circuit for reproducing or playing back the video recorded on the magnetic tape in the apparatus of FIG. 1. The video signals picked up by each of the heads 20 and 21 is amplified by respective associated amplifiers 60 and 61 and combined at the input to the amplifier, 62. The frequency modulated signal is limited in amplitude in several limiter stages 63 to eliminate all amplitude variations in the resultant signal and is then applied to a demodulator which recovers the video signal on the frequency modulation carrier. The video signal is amplified by amplifiers 65 and 67 and is then applied to an impedance matching output stage 68. The output of stage 68 may be applied to a display device (not shown). In order to assure positive vertical synchronization in the display device, vertical sync pulses may be applied at the input terminal 69 of the amplifier 67. Such pulses are obtained from the 60 cycle per second pulse generator 34 of FIG. 1.

Figure 5:
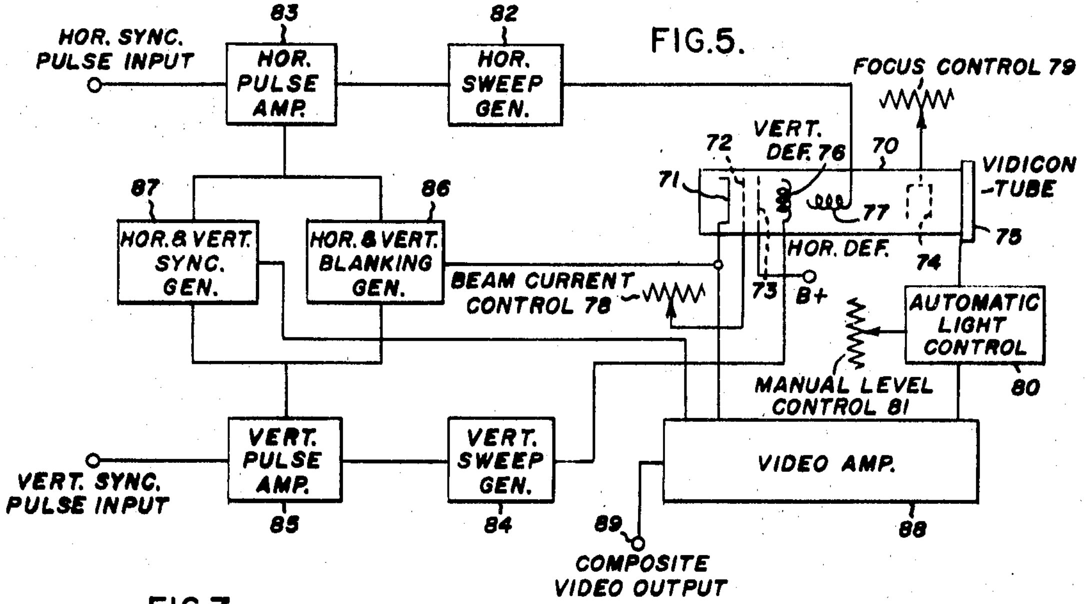
FIG. 5 is a block diagram of the television camera used in the system in accordance with the present invention.

Referring now to FIG. 5, there is shown a block diagram of a camera circuit utilizing a vidicon camera tube 70 suitable for converting images into electrical signals. The vidicon camera tube 70 includes a cathode 71, a control grid 72, an anode 73, a focus electrode 74 and a target electrode 75. Associated with the vidicon tube are vertical deflection and horizontal deflection coils 76 and 77, respectively. In operation, appropriate voltages are applied to the electrodes of the tube to produce a beam of electrons flowing from the cathode 71 to the target electrode 75. Images focused on the target electrode cause the resistivity of the regions of the target electrode to vary in accordance with the intensity of light falling on those regions. Accordingly, as the electron beam of the vidicon tube is caused to scan the target electrode, in response to currents applied to the horizontal and vertical deflection coils, variations in current flow in the external circuit connecting cathode and target electrodes are produced. Such variations in current represent the video signal. Electron beam current of the vidicon tube is set to the proper value by the application of an appropriate potential to the control grid by means of control potentiometer 78. The focusing of the electron beam of the tube is achieved by applying appropriate focus voltages to the focus electrode from control potentiometer 79. The camera may be provided with an automatic light control circuit 80 which consists basically of a very high impedance in series with the target electrode. When high intensity images are focused on the target electrode, the resistance of the target electrode is reduced considerably, thereby permitting large currents to flow through the high impedance, Such high currents produce a large voltage drop in the impedance and lowers the target voltage and hence the sensitivity of vidicon tube. A potentiometer 81 is usually used in such a circuit for setting the proper initial level of the target voltage for good automatic regulation. If desired, the camera tube could be regulated entirely manually to provide the proper target voltage for various ambient light levels.

Horizontal sweep current to the camera is provided by a horizontal sweep generator 82 which is driven by the horizontal pulse amplifier 83. The drive for the horizontal pulse amplifier 83 is obtained from the horizontal pulse amplifier 37 of FIG. 1. The current for the vertical deflection coils is obtained from the vertical sweep generator 84 which is driven by the vertical pulse amplifier 85 which in turn is driven by the vertical pulse amplifier 36 of FIG. 1. Horizontal and vertical blanking pulses for blanking the beam of the vidicon tube during horizontal and vertical retrace is obtained from the horizontal and vertical blanking generator 86. The horizontal and vertical blanking developed from such source is applied to the cathode 71 to bias the cathode with respect to the grid 72 to cause the beam to be cut off during the retrace interval. Horizontal and vertical synchronizing pulses for formation of a composite video are developed form the output of the horizontal pulse amplifier 83 and the vertical pulse amplifier 85 in the horizontal and vertical synchronizing signal generator 87. The video signal obtained from the target electrode circuit of the vidicon tube is amplified in the video amplifier 88 and the output of the video amplifier is combined with the output of the horizontal and vertical synchronizing generator 87 and the horizontal and vertical blanking generator 86 to provide the composite video output at terminal 89.

Figure 6:
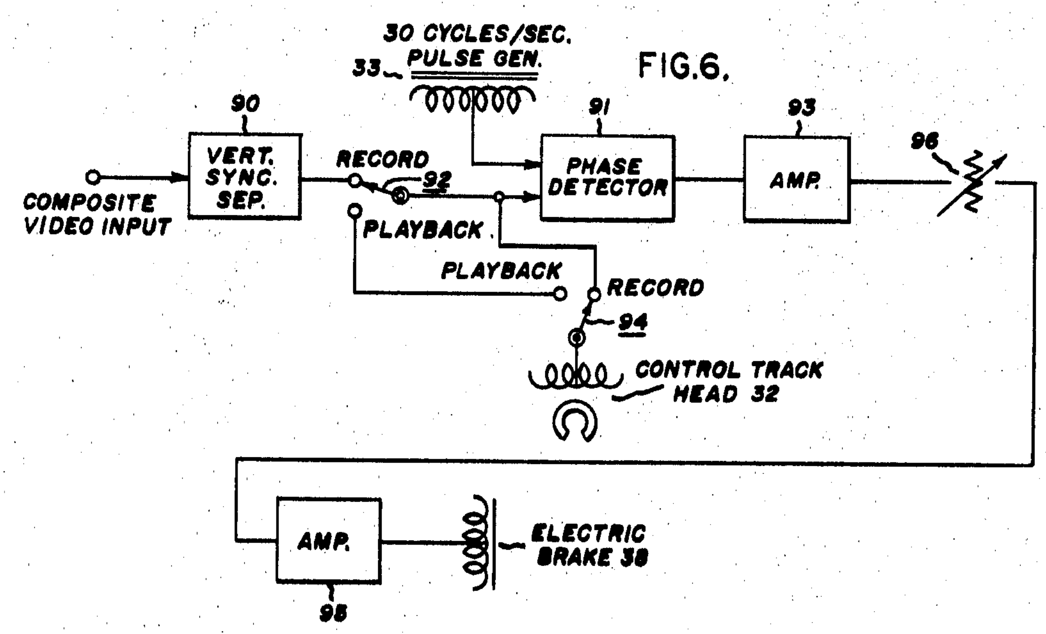
FIG. 6 is a block diagram showing the circuit which is used for maintaining proper synchronization between the longitudinal motion of the tape and the scanning motion of the record and playback heads.

Referring now to FIG. 6 there is shown block diagram of a circuit for maintaining proper synchronization of the heads 20 and 21 with incoming video when recording and with reproduced video when playing back. With switch 92 and 94 in the record position composite video is applied to the vertical synchronization separator 90 from which a vertical synchronization signal of nominally 60 cycles per second is obtained. The vertical synchronization signal or pulse train and a 30-cycle per second pulse train from the 30-cycle pulse generator 33 of FIG. 1 is applied to the phase detector 91 which compares the two signals and develops a unidirectional or DC output corresponding to the phase relationship of the two pulse trains. The output is amplified by amplifiers 93 and 95 and applied to electric brake 38. When the head 20 and 21 depart from synchronism with respect to the input synchronization pulses, the output of phase detector 91 changes in a direction to produce the braking action required to restore synchronism. Potentiometer 96 is connected between the amplifier 93 and amplifier 95 go provide a fine or vernier control for synchronization. Concurrently, the vertical synchronizing signal from vertical synchronization separator 93 is applied to the control track head 32 of FIG. 1 which records control pulses on portion 46 on the tape 40 of FIG. 2. With the switch 92 and 94 in the playback position, the recorded control pulses are reproduced from the tape and applied to the phase detector 91 in place of the vertical sync pulses from vertical sync separator 90. The control pulses and the 30-cycle per second reference pulse from the pulse generator 33 are compared in the phase detector 92 and a DC output is developed from the amplifier 95 and applied to brake 38 to maintain the rotation of the video heads 20 and 21 in synchronism with the appearance of each track of the tape 15 in the slot 14.

Figure 7:
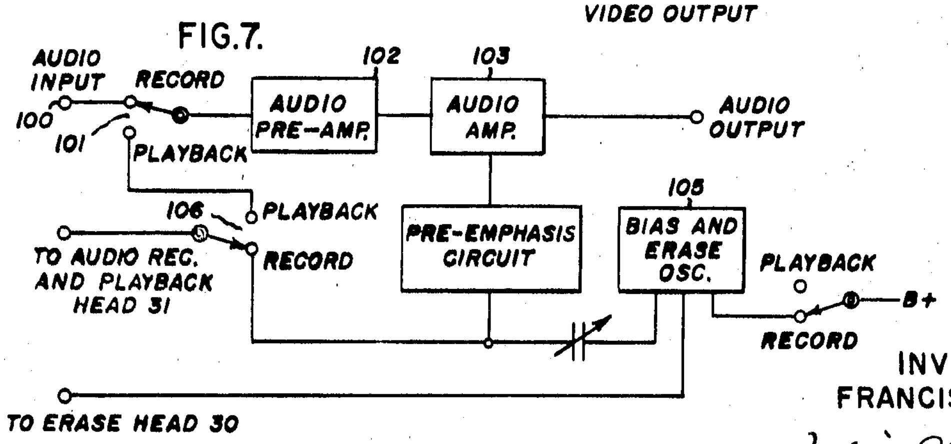
FIG. 7 is a block diagram of the circuit used for recording and reproducing audio signals on a portion of the magnetic tape concurrently with the application of video signals thereof.

Referring now to FIG. 7, there is shown a block diagram of a circuit for impressing audio signals on the tape, for recovering recorded audio signals from the tape, and for providing erase of the tape prior to the recording of both video and audio signals on the tape. Audio signals to be recorded are applied at terminal 100 and passed through a single-pole double-throw switch 101 to an audio preamplifier 102. The output from the preamplifier 102 is applied to another audio amplifier 103, the output of which is passed through a preemphasis circuit 104 and mixed with the output from bias signal oscillator 105 and then applied to the audio head 31 through single-pole double-throw switch 106. Concurrently with the application of the bias signal to the recording head, oscillatory signals are applied to the erase head to erase any prior recording on the tape. To reproduce the recording the bias oscillator 105 is disabled by removal of operating power therefrom and audio head 31 is connected through switches 106 and 101 in their playback position to the audio preamplifier 102. The output of the audio preamplifier 102 is connected to the audio amplifier 103, the output of which inturn may be connected to a suitable audio transducer.

In connection with FIGS. 1, 2, 3, 4, 6 and 7 a skip-field helical scan video tape recorder for recording video signals on magnetic tape and reproducing video signals therefrom is described. In connection with FIG. 5 a camera for converting images into electrical signals for recording on magnetic tape by the video recorder is described. It has been mentioned that for portable applications the functions of the recorder associated with reproduction of electrical signals from the magnetic tape, such as tape serving, could be eliminated to simplify the design and reduce weight and size. In accordance with my invention further reductions in size, weight and complexity are obtained without sacrificing performance. To this end the horizontal and vertical scan or sweep frequencies of the camera are reduced by a factor or two. In the embodiment described such a provision reduces the bandwidth required in the video amplifiers of the camera and therefore the number of stages required for equal gain. The signal to noise performance of the camera is improved because the shunting effect of stray capacitance of the camera has less effect at the reduced video frequencies utilized. Sweep power is also reduced. In one embodiment of the recorder the same diameter of video head drum with 180° helical wrap is used. The heads exactly 180° apart and connected together electrically are used. The heads are rotated at one-half normal playback rate. With this arrangement each field of scan by the camera is recorded on the tape with the heads alternating in the performance of the recording function. As the rate image by the camera and the rate of scan of the recording medium by the recording heads is reduced by the same factor no real time errors appear in the image reconstructed from the video obtained by scanning each track twice and at a rate twice the rate of recording. As the longitudinal speed of the tape has not been changed, the recording and reproduction of audio signals is unaffected by the alterations made in the video processing portions of the system. A recording system such as described requires drive motors of lesser power. Also in such a system the 30 -cycles/sec pulse generator 33 of FIg. 1 could be eliminated as generator 34 would provide the 30-cycle/sec pulse required for synchronization.

Figure 8:
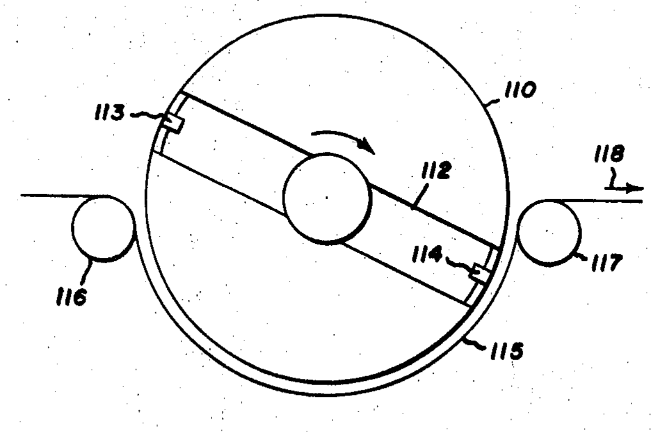
FIG. 8 is a plan view in schematic form of the rotor and drum assembly for use in one embodiment of the present invention.
Figure 9:
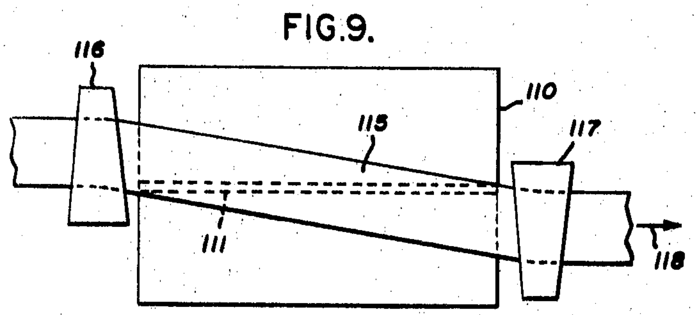
FIG. 9 is a front view of the rotor and drum assembly of FIG. 8.

FIGS. 8 and 9 show, respectively, plan and front views of a portion of the tape transport and video head scanning mechanisms which are used in the slow scan recording system described in the preceding paragraph. In these FIGS. are shown a video head drum 110 having a slot 111 of substantially 180° extent in the surface thereof and a rotor 112 coaxial with the drum and rotatable therein. The rotor has a pair of video recording heads 113 and 114 placed 180° apart thereon and lying in the plane of slot 111 adjacent to the drum 110. Magnetic tape 115 is threaded about a pair of tapered guides 116 and 117 positioned on opposite sides of the drum in the direction indicated by arrows 118 to form a half-helix on the surface of the drum. In the operation of the recorder, to record slow scan video signals of horizontal and vertical scan frequencies one-half those to be used for playback on a skip-field playback apparatus, the tape is moved in the longitudinal direction at the normal playback rate, the speed of the rotor 112 is reduced in half, and the video heads are electrically connected and supplied with the video signals from a camera such as described in FIG. 5 modified to have a slow scan of the character described above, through the recording circuit of FIG. 3. During normal playback, some mistracking can occur as a result of having recorded at a lower scanning speed than the scanning speed employed during readout. This is because the slant angle of the tracks on the tape recorded at half the readout scanning speed, or angle formed at each intersection of a track with the longitudinal dimension of the tape, is slightly smaller than the slant angle of the paths traversed by the heads across the tape during readout. Those skilled in the art will recognize that one of the tape guides normally present on commercial recorders of this type should be shifted for recording, so that the tape is positioned to yield a slant angle during recording at half readout scanning speed that would be identical to the slant angle produced during recording at full readout scanning speed. This is necessary to permit each recorded track to extend across the entire active portion of tape width or entire portion of tape width in which the tracks are normally recorded.

Figure 10:
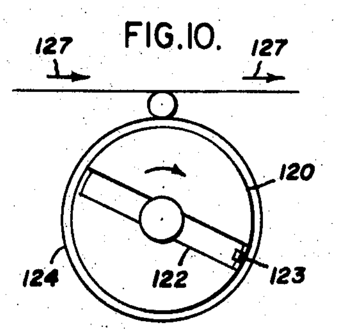
FIG. 10 is a plan view of the rotor and drum assembly for use in another embodiment of the present invention.
Figure 11:
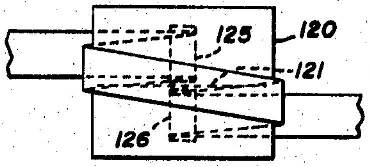
FIG. 11 is a front view of the rotor and drum assembly of FIG. 10.

The same recorded result achieved in connection with the tape transport and head scanning mechanism of FIGS. 8 and 9 can also be achieved with the tape transport and head scanning mechanism of FIGS. 10 and 11. In these FIGS. are shown a video head drum 120 one-half the diameter of the drum of FIGS. 8 and 9 and having a slot 121 extending entirely around the drum. A rotor 122 is provided within the drum and coaxial therewith. A single head 123 is located on the rotor 122 in the plane of the slot 121 adjacent to the drum. Magnetic tape 124 is threaded about a pair of guides 125 and 126 substantially axial aligned adjacent to one another, in the direction indicated by arrows 127 to form a single turn helix on the surface of the drum. In operation, the tape 124 is moved longitudinally at the speed it would be for playback and the video head 123 is rotated at the same speed as the speed of heads on the playback recorder. The video signal from the slow scan camera of one half horizontal and vertical deflection frequencies are applied through a modulation circuit such as shown in FIG. 3 to the single head 123. Each field of video is recorded on a track of the magnetic tape. On playback on a skip-field playback apparatus as each field is played back twice at twice the recording rate no real time errors appear in the images reconstituted from such video. An important advantage of the system of FIGS. 10 and 11 is reduction in size of the recording drum and hence the entire recording apparatus. Moreover, the recorded track format is identical in configuration to the format which is recorded on a conventional skip field, helical scan recorder operating at full readout scanning speed.

While the invention has been described in specific embodiments, it will be appreciated that many modifications may be made by those skilled in the art, for example, the horizontal and vertical electron beam scan rate of the camera and the corresponding rate of travel of a recording head with respect to the tape could be divided by any other integral factor than two, and correspondingly on playback the reproducing head would be made to scan such recorded tracks at a rate multiplied by such factor. I intend by the appended claims to cover all such modifications and changes as fall within the true spirit and scope of the invention.

I claim:

1. The method of recording on, and reproducing from, an elongated magnetic recording medium, video signals representative of images, said method comprising the steps of:

scanning said images at one line rate and one field rate to develop video signals corresponding thereto;

moving said magnetic medium at a constant velocity in the direction of the elongated dimension thereof;

applying said video signals to a magnetic recording head means;

scanning said magnetic medium with said recording head means at a constant velocity along the width dimension of said medium to record said video signals in parallel tracks which extend across the medium and which are generally at a skew angle with respect to the direction of movement of the magnetic medium:

the velocity of said head correlated with the rate of field scan of said video signals such that successive fields are recorded on adjacent tracks; and successively scanning each of said tracks twice at twice said constant scan velocity to develop output video signals capable of reproducing said images at twice said line rate and field rate.

2. A method of recording and reproducing images sensed by a television camera, said method comprising:

scanning said images at a first line rate and a first field rate to develop video signals corresponding thereto;

moving an elongated magnetic medium at constant speed in the direction of its elongated dimension;

applying said video signals to a magnetic recording head;

moving said magnetic recording head at constant velocity relative to the width dimension of said medium to record said video signals at a predetermined linear rate along parallel tracks across said medium and generally at a skew angle with respect to direction of movement of said medium; and successively scanning each of said tracks twice at twice said predetermined linear rate to develop output video signals capable of reproducing said images at twice said line rate and field rate.